(12) United States Patent
Girard (10) Patent No.: US 8,284,203 B2
(45) Date of Patent: *Oct. 9, 2012

(54) LOOPING MOTION SPACE REGISTRATION FOR REAL-TIME CHARACTER ANIMATION

(75) Inventor: Michael Girard, Palo Alto, CA (US)

(73) Assignee: Autodesk, Inc., San Rafael, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/430,332

(22) Filed: Mar. 26, 2012

(65) Prior Publication Data

US 2012/0188257 A1      Jul. 26, 2012

Related U.S. Application Data

(63) Continuation of application No. 11/833,953, filed on Aug. 3, 2007, now Pat. No. 8,154,552.

(60) Provisional application No. 60/916,259, filed on May 4, 2007.

(51) Int. Cl.
 *G06T 13/00* (2011.01)

(52) U.S. Cl. ........................................ 345/473; 345/474

(58) Field of Classification Search .................. None
See application file for complete search history.

(56) References Cited

U.S. PATENT DOCUMENTS

| 5,864,342 A * | 1/1999 | Kajiya et al. | 345/418 |
| 5,982,389 A * | 11/1999 | Guenter et al. | 345/474 |
| 5,999,195 A * | 12/1999 | Santangeli | 345/473 |
| 6,011,562 A * | 1/2000 | Gagne et al. | 345/473 |
| 2005/0001842 A1 * | 1/2005 | Park et al. | 345/474 |

OTHER PUBLICATIONS

Egges, A.; Molet, T.; Magnenat-Thalmann, N.;, "Personalised real-time idle motion synthesis," Computer Graphics and Applications, 2004. PG 2004. Proceedings. 12th Pacific Conference on, Oct. 6-8, 2004.*

Lucas Kovar and Michael Gleicher. 2003. Flexible automatic motion blending with registration curves. In Proceedings of the 2003 ACM SIGGRAPH/Eurographics symposium on Computer animation (SCA '03). Eurographics Association, Aire-la-Ville, Switzerland, Switzerland, 214-224.*

Rose, C.; Cohen, M.F.; Bodenheimer, B.;, "Verbs and adverbs: multidimensional motion interpolation," Computer Graphics and Applications, IEEE, vol. 18, No. 5, pp. 32-40, Sep./Oct. 1998.*

* cited by examiner

*Primary Examiner* — Daniel Hajnik (74) *Attorney, Agent, or Firm* — Patterson & Sheridan, LLP (57) ABSTRACT

A method for generating a looping motion space for real-time character animation may include determining a plurality of motion clips to include in the looping motion space and determining a number of motion cycles performed by a character object depicted in each of the plurality of motion clips. A plurality of looping motion clips may be synthesized from the motion clips, where each of the looping motion clips depicts the character object performing an equal number of motion cycles. Additionally, a starting frame of each of the plurality of looping motion clips may be synchronized so that the motion cycles in each of the plurality of looping motion clips are in phase with one another. By rendering an animation sequence using multiple passes through the looping motion space, an animation of the character object performing the motion cycles may be extended for arbitrary length of time.

21 Claims, 8 Drawing Sheets

LOOPING MOTION SPACE REGISTRATION FOR REAL-TIME CHARACTER ANIMATION

CROSS-REFERENCE TO RELATED APPLICATIONS

This application is a continuation of the U.S. patent application having Ser. No. 11/833,953 (now U.S. Pat. No. 8,154,552), filed Aug. 3, 2007, which claims benefit of the U.S. provisional patent application having Ser. No. 60/916,259, filed May 4, 2007. Both of these related applications are hereby incorporated herein by reference.

BACKGROUND OF THE INVENTION

1. Field of the Invention

The present invention generally relates to computer software. More specifically, the present invention relates to a rendering application configured to generate rendered animation clips from a looping motion space.

2. Description of the Related Art

Rendering tools refer to a broad variety of computer-based tools used by architects, engineers, animators, video game designers, and other graphics and design professionals. Broadly, rendering is the process of generating an image from a model using computer programs. A rendering application may be used to render three-dimensional (3-D) characters. These 3-D characters may be animated by the rendering application.

A highly desirable feature of rendering applications is the ability to generate realistic motion sequences of a moving character, e.g., a man walking or running or a bird in flight. To create a motion sequence, users of a rendering application typically begin with one or more motion clips from which the motion sequence is created. Frequently, motion clips are created using a motion capture system. For example, an actor may wear markers near each joint to identify the motion by the positions or angles between the markers. The markers are then tracked to sub-millimeter positions. Motion capture software records the positions, angles, velocities, accelerations, and impulses, providing an accurate digital representation of the motion.

Creating realistic motion sequences has proven to be challenging. Currently, a common approach to character animation is to use a motion graph. Typically, motion sequences, like those found in video games, use motion graphs to represent a set of possible transitions between motion clips. For example, suppose an animator has two motion clips, one where a character is walking turning gradually 30 degrees to the right, and a second motion clip where a character is walking turning gradually 30 degrees to the left. Using motion graphs, an animator may create a motion sequence where the character transitions from walking gradually to the right to walking gradually to the left. This approach has several shortcomings, for example, the motion graph limits the animator to only a fixed set of variations that may be sequenced in different orders.

Further, the motion clips are of a finite length, and when looped to create a longer sequence, prior art techniques have been unable to generate realistic transitions between instances of the motion clip. One approach to avoid this result is to avoid looping sequences completely. However, not using looping for common sequences, especially sequences with repeating cycles, consumes valuable computational resources. A second approach has been to use a variation of the traditional motion graph approach that depends on finding single matching transition frame poses within the participating clips. This approach essentially blends the end of one motion clip with the beginning of the next. Typically, loops of the clips are blended as a frame-to-frame linear time "dissolve" across the transition, and since the motions are not time warped to be in phase, the character may appear to jump, slide or otherwise engage in some non-realistic motion. Thus, this approach suffers from the same artifacts of traditional motion graph approaches; namely, a transition with motion that appears unrealistic.

Accordingly, there remains the need in the art for a technique for generating realistic looping motion space for real-time character animation.

SUMMARY OF THE INVENTION

Embodiments of the invention may be used to generate a looping motion space for real-time character animation. This may be done by synthesizing each motion clip in a motion space to have the same number of periodic cycles. The motion clips are synchronized so that each one begins in phase on a matching registered frame. The clips may be padded so that the pose of the first and last frames are substantially identical. A looping registration curve is calculated to spatially and temporally align the frames of each clip. Registered clips can then be seamlessly joined together to create arbitrarily long motion sequences in the looping motion space. The arbitrarily long motion sequence may then be translated into a world space. For example, if an animator wanted to create a motion sequence of a character walking through eight steps, the animator could loop two passes through a looping motion space of four steps to create the desired sequence. Because the beginning frame of the animation generated from the looping motion space matches the ending frame, the two passes blend seamlessly together.

One embodiment of a method of rendering an animation sequence from a plurality of looping motion clips included in a looping motion space includes identifying a first looping motion clip and a second looping motion clip from the plurality of looping motion clips to blend together. The first and second looping motion clips may each depict a character object performing an equal number of motion cycles, and a first frame of the first looping motion clip may be synchronized with a first frame of the second looping motion clip so that the motion cycles in each of the first and second looping motion clips are in phase with one another. The method may also include rendering a first frame of the animation sequence by blending the first frame of the first looping motion clip and the first frame of the second looping motion clip and rendering subsequent frames of the animation sequence by blending each subsequent frame of the first looping motion clip with a corresponding subsequent frame of the second looping motion clip. Upon determining that a last frame of the first looping motion clip and a last frame of the second looping motion clip have been blended and rendered as a frame of the animation sequence, a next frame of the animation sequence may be rendered by blending the first frame of the first looping motion clip and the first frame of the second looping motion clip.

Thus, advantageously, embodiments of the invention allow users to generate a looping motion space used for real-time character animation.

DETAILED DESCRIPTION OF THE PREFERRED EMBODIMENTS

Embodiments of the invention provide a rendering application configured to generate a looping motion space that may be used for real-time character animation. In one embodiment, the rendering application may provide character generation tools that allow users to specify a variety of parameters for generating a character object. For example, a user may specify a number of parameters to define a human character. The looping motion space may then represent the motion of the human character walking through a specified number of steps, or moving through any other sequence of periodic motion. Of course, embodiments of the invention may be used to generate a looping motion space to represent the motion of any other rendered object (e.g., an animal, a vehicle, etc.).

In one embodiment, the looping motion space may be created by computing a registration curve for two or more pre-defined motion clips, each depicting a different sequence of periodic motion. For example, in motion clips of a walking character, a first clip may depict the character walking while turning to the left and a second clip may depict the character walking to the right. The registration curve may be generated by identifying the number of motion cycles present in the first motion clip and synchronizing the cycles with ones present in the second. Additionally, the registration curve may be created such that the beginning and ending frames of each motion clip in the looping motion are substantially identical. Thus, when used to create an animation clip, regardless of the rendered "path" through the looping motion space, the generated animation clip includes the same number of cycles, and begins and ends on the substantially same frame. By using an arbitrary number of passes through the looping motion space, an arbitrarily long rendered animation sequence of the character object may be generated. Further, any range of motion "between" the motion clips in the looping motion space may be rendered on a given pass through that looping motion space by adjusting the weights used to blend individual frames.

Figure 1:
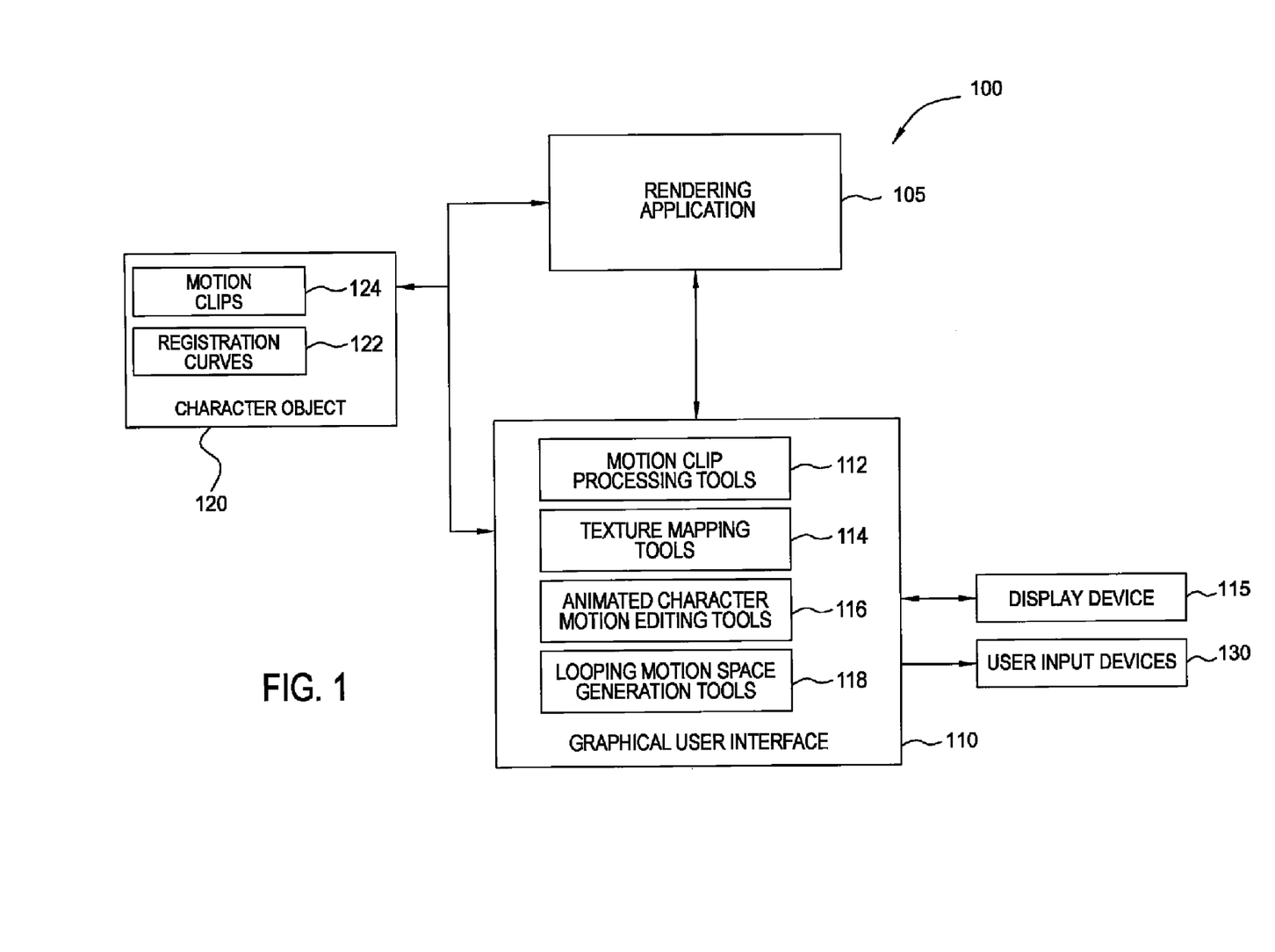
FIG. 1 is block diagram illustrating components of a rendering application used to generate a looping motion space for real-time character animation, according to one embodiment of the invention.

FIG. 1 is block diagram illustrating components of a rendering application used to generate a looping motion space for real-time character animation, according to one embodiment of the invention. The components illustrated in system 100 may include computer software applications executing on existing computer systems, e.g., desktop computers, server computers, laptop computers, tablet computers, video game consoles, and the like. The software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with rendering application 105 at another physical location. Also, in one embodiment, rendering application 105 and graphical user interface 110 may be provided as an application program (or programs) stored on computer readable media such as a CD-ROM, DVD-ROM, flash memory module, or other tangible storage media.

As shown, the system 100 includes, without limitation, rendering application 105, graphical user interface 110, a character object 120, user input devices 130, and a display device 115. Those skilled in the art will recognize that the components shown in FIG. 1 are simplified to highlight aspects of the present invention and that a typical rendering application 105 and GUI interface 110 may include a broad variety of additional tools and features used to compose and manage character objects 120. Typically, user input devices 130 include a mouse pointing device, a keyboard, or joystick or video game controller and display device 115 is a CRT or LCD display.

Rendering application 105 may be a software application configured to allow users interacting with GUI interface 110 to manipulate a character object 120. Accordingly, rendering application 105 and GUI interface 110 may include programmed routines or instructions allowing users to create, edit, load, and save character objects 120. As used herein, character object 120 represents any object that is to be the subject of a looping motion space. In one embodiment, the looping motion space may be used to render an animation clip of character object 120 performing some form of cyclic motion, such as a walking human, a flying bird, or a galloping horse. Typically, each pass through the looping motion space includes the character completing multiple cycles of the cyclic motion. Multiple passes through the looping motion space creates an animation sequence that may have arbitrary length.

Illustratively, character object 120 includes motion clips 124 and registration curves 122. Motion clips 124 may be pre-defined motion clips generated using a motion capture system. Alternatively, users of the rendering application 105 may define new motion clips 124 manually. Motion clips 124 may include a sequence of frames of geometrical primitives such as points, lines, curves, and polygons that collectively depict some form of motion performed by character object 120. For example, motion clips 124 may include a sequence of frames that depict a wire-frame skeleton of human engaging in a walking motion. Further, when a rendered animation clip is generated, texture mapping may be used to give character object 120 a desired appearance. As is known, texture mapping is a method of adding detail, surface texture, or color to a computer-generated graphic or model.

Registration curves 122 may be used to define the relationship between the frames of a first motion clip 124 and corresponding frames of a second motion clip 124 within a looping motion space. As is known, registration curve 122 provides a data structure specifying the relationships involving the timing, local coordinate frame, and constraints between frames in the first motion clip 124 and corresponding frames in the second motion clip 124. Registration curve 122 may be used to expand the range of motions that can be automatically blended from the first and second motion clips 124 to generate an animation clip without requiring manual intervention. For example, one motion clip 124 may show a walking character turning 30 degrees to the right and a second motion clip 124 may show the character turning gradually 30 degrees to the left. By computing registration curve 122 between the first and second motion clips, an animation clip may be blended from the motion clips to show the character walking anywhere within the motion space between the two motion clips. That is, where the character appears to walk while gradually turning anywhere from one extreme (30 degrees right) to the other (30 degrees to the left), or to anywhere in between. For additional examples related to the use of registration curves in computer graphics, see Kovar, L., and Gleicher, M. "Flexible automatic motion blending with registration curves." In Proceedings of ACM SIGGRAPH/Eurographics Symposium on Computer Animation (2003), incorporated by reference herein in its entirety.

Graphical user interface 110 provides tools used to manipulate animated character objects 120. As shown, graphical user interface 110 includes motion clip processing tools 112, texture mapping tools 114, animated character motion editing tools 116, and looping motion space generation tools 118. Those skilled in the art will recognize, however, that the tools of GUI interface 110 shown in FIG. 1 are simplified to highlight aspects of the present invention and that a typical rendering application 105 and GUI interface 110 may include a broad variety of additional tools and features used to compose an animated character object 120.

In one embodiment, motion clip processing tools 112 may provide graphical user interface elements that allow a user to create and modify motion clips 124. Motion clip processing tools 112 may allow the user to define and modify physical, display, and meta properties of motion clip 124 to be used and stored in a character object 120. Each motion clip 124 may provide a sequence of frames showing a character engaging in some form of motion (e.g., a human character walking, jogging, or running, etc.). Texture mapping tools 114 may allow a user to add detail, surface texture, or color to character object 120 using one or more texture maps. For example, texture mapping tools 114 may allow a user to give a wireframe skeleton the appearance of a football player wearing a uniform.

Animated character motion editing tools 116 may be used to manipulate animation clips of character object 120. A user may wish to create a blended motion using two or more motion clips 124. In one embodiment, animated character motion editing tools 116 may be used to create registration curve 122 between two motion clips 124. Once registered to one another, animated character motion editing tools 116 may be used to create a blended animation clip from the motion clips 124. In one embodiment, a blended animation clip may be generated in real-time. That is, an animation clip may be rendered from motion clips 124, where individual frames are blended together at a rate that allows blended frames to be presented as an ongoing animation clip. For example, a rendered animation clip may be generated in real-time to show a character in a video game walking or running from one location to another. In such a case, the direction and rate of turn (and hence the rate of blending between motion clips 124) may be controlled by a game player. Further, in one embodiment, a looping motion space may be used to allow the walking motion of the character to continue for an arbitrary length of time, by rendering multiple passes through the looping motion space.

In one embodiment, looping motion space generation tools 118 may allow a user to generate an animation clip of character object 120 that extends the motion of character object 120 indefinitely. A motion clip 124, and hence a looping motion space that includes motion clip 124, has a finite length. Thus, if a user generates an animation clip by blending the frames of two motion clips 124, the resulting sequence also has a finite length. In many applications that involve character animation, it is desirable to have character motion for an extended period of time. This is often the case in video games where a character is constantly moving. Accordingly, embodiments of the invention provide a looping motion space that may be used to render character object 120 performing an arbitrary number of motion cycles, particularly periodic locomotion of character object 120, such as a human character, walking, jogging, or running, etc.

In one embodiment, a method of generating looping motion space for real-time character animation may include a pre-computation phase and a real-time phase. The pre-computation phase may include computing a registration curve 122 for a first and second motion clip. Additionally, the frames in the motion clips may be sequenced such that the beginning and ending frames of the first and second motion clips are substantially identical to one another and that the motion depicted in the clips are in phase with one another. For example, for two motion clips of a walking character, both clips may be sequenced so that each one begins with the character performing a right foot forward step. Registration curve 122 may also specify a registration between each frame of the first motion clip and a corresponding frame in the second motion clip.

The real-time, or rendering phase, may include rendering an animation clip frame-by-frame by blending frames of the two motion clips. When used to render an animation clip, corresponding frames of the first and second motion clip are blended together to create frames of the rendered animation. Regardless of the rendered "path" through the looping motion space, the rendered animation includes the same number of motion cycles, and begins and ends on the substantially same frame. Depending on how the frames are blended together, the motion of the character may be controlled. Additionally, character object 120 depicted in the frames of the rendered animation may be mapped into a world coordinate space of a graphics scene and texture mapped to have the desired appearance. For example, the walking character may be translated into a graphics scene depicting a football field and texture mapped with the uniform of a football player.

Figure 2:
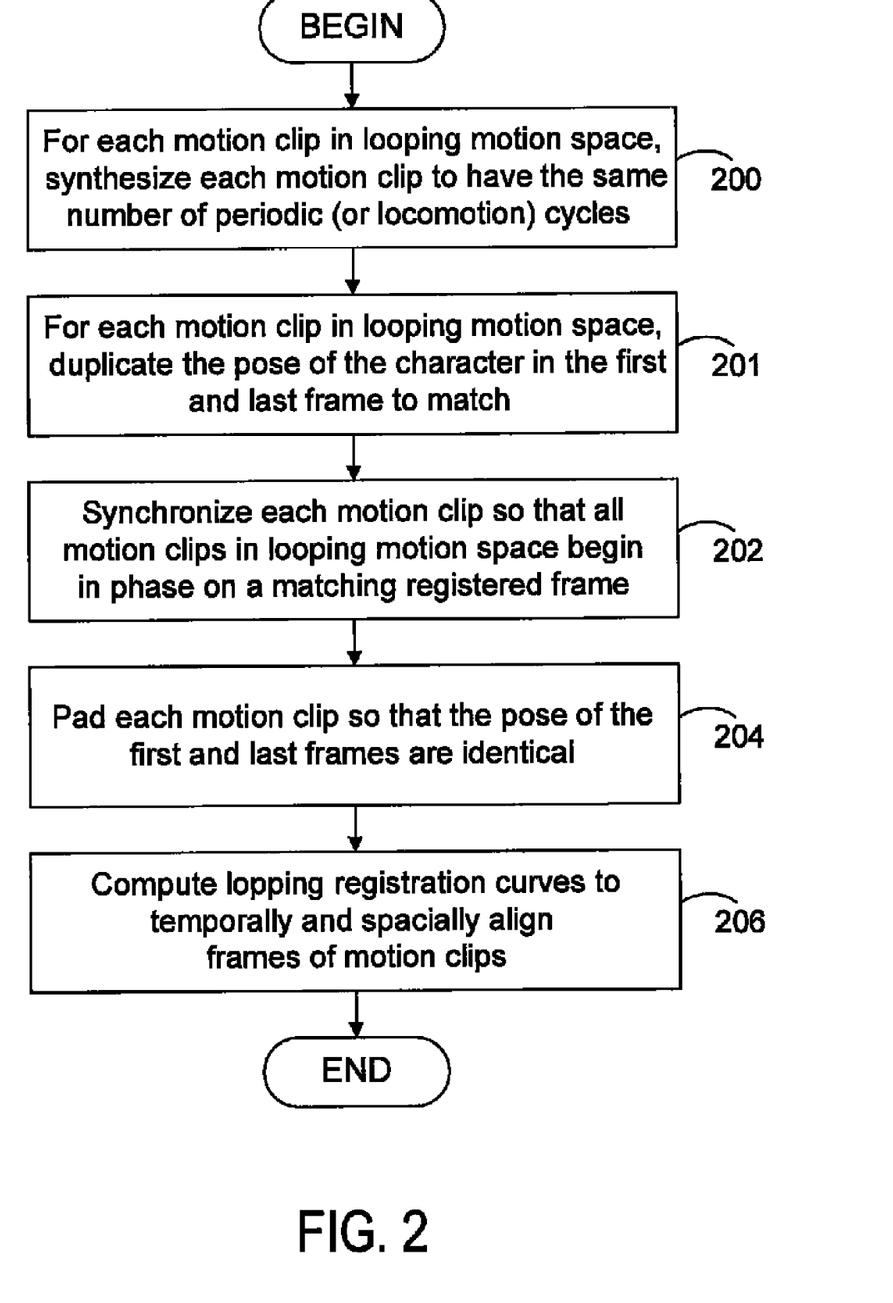
FIG. 2 is a flow chart illustrating a method for generating a looping motion space for real-time character animation, according to one embodiment of the invention.

FIG. 2 is a flow chart illustrating a method for generating a looping motion space for real-time character animation, according to one embodiment of the invention. Persons skilled in the art will understand that even though the method is described in conjunction with the systems of FIGS. 1 and 3, any system configured to perform the steps of the method illustrated in FIG. 2, in any order, is within the scope of the present invention.

At step 200, for each motion clip in the looping motion space, the rendering application synthesizes each motion clip to have the same number of periodic (or locomotion) cycles. For example, a user may want to create a looping motion space of a human character from two motion clips of a human figure performing a walking motion. Motion clip A may be a walking clip with six locomotion cycles (i.e., six walking steps). Motion clip B, however, may be a walking clip that includes only four locomotion cycles (i.e., four walking steps). During this step, the motion clips are pre-processed to have the same number of periodic cycles, bounded by the number of periodic cycles in the shortest clip. Thus, in this example, each motion clip is processed to have a maximum of four periodic cycles because the shortest clip (motion clip B) has four cycles.

Although this may be done using conventional manual editing techniques available in some commercial software, an alternative approach exploits properties of motion registration to create loops automatically using a match web. As is known. A match web is a graph representation that records the similarity of a character's pose as a "distance" with one motion clip's frames along a horizontal X axis and a second motion clip's frames along a vertical Y axis. An algorithm then determines, based on the motion segments in the match web, the proper registration curve by determining which frames, given a sufficiently large distance threshold, may be considered numerically similar. For example, one algorithm for computing the registration curve using a match web includes Dijkstra's a "dynamic programming" algorithm, which may be used to identify the shortest path through the match web. When match webs of periodic locomotion clips are registered with themselves, a series of diagonal minimal cost chains appear that correspond with each phase alignment between matching locomotion cycles. If a registration curve is computed for each matching phase chains, since the clip is being compared against itself, the registration along the middle diagonal is a straight line, and the curves on each side are a symmetrical mirror with respect to this middle diagonal line. The number of curves below the diagonal corresponds with the number of locomotion cycles in the motion clip.

Furthermore, each registration curve may be selected to produce a desired number of periodic cycles in a resulting loop, with the uppermost longer curves below the middle diagonal producing the maximum number of cycles. Continuing with the above example of two motion clips A and B of six and four locomotion cycles, respectively, suppose a registration curve is desired for two clips each having three locomotion cycles. A motion clip having six periodic cycles may be created that includes six registration curves in the match web below the diagonal, and, the rendering application may count and select the desired registration curve that corresponds with three cycles (that is, by counting down three from the top: six, five, four, then three). This process may be computed for each motion clip in the motion space so that all motion clips have three period cycles (or other desired number).

At step 201, the pose of the character in the first frame and the last frame of each motion clip are duplicated to match one another. Thus, each motion clip includes the same number of periodic cycles, and each motion clip begins and ends on the same frame, relative to itself. Therefore, each individual motion clip creates a loop of the periodic motion cycle depicted in that looped motion clip.

At step 202, the rendering application synchronizes the motion clips so that each one begins on a frame that is in phase with a matching frame in other motion clips included in the looping motion space. Because each motion clip includes a loop with the same number of cycles of periodic motion, any frame may be selected as the starting frame. For example, for a walking motion, the frames of multiple motion clips may be sequenced so that each one begins with the character about to take a step with a right foot. Thus, each motion clip in the looping motion space may include multiple cycles of periodic motion, where each motion clip begins at the same phase through the cycle as the other sequences included in the looping motion space.

At step 204, the rendering application may pad each motion clip so that the pose of the character in the first and last frames are identical. In one embodiment, a motion clip stores, at each frame, a) the rotation angles of the character's joints and b) the translational position of the character's root position. When, new frames are chosen to start a motion loop, care must be taken to retain the translational information in the motion. A "padding" operation is executed that first copies a two frame segment that starts with the frame that precedes the "in phase" starting frame. After the loop is cycled to begin on a desired new starting frame, this segment may then be appended onto the last frame, thus retaining the incremental positional offset from the preceding frame to the duplicated pose at the last frame. Alternatively, this "padding" operation may be computed by explicitly storing a set of velocity vectors from the preceding frame with each frame's pose, and then reconstructing each frame's position from these incremental velocities after appending the new starting frame at the end. Using the motion space registration techniques, a synchronized frame may be computed for each motion clip, with the synchronized frame becoming the starting (and ending frame) of each motion clip. Then, each motion clip in the looping motion space begins and ends on the same synchronized frame.

At step 206, a rendering application computes looping registration curves to temporally and spatially align frames of motion clips in the looping motion space with one another. Because each motion clip is synchronized with all others at the first and last frames, registration curves may be computed to match frames in each motion clip to frames in each other motion clip. Thus, the motion clips included in the looping motion space may be blended to create an animation clip anywhere inside the motion space. Because of the specific properties of the individual motion clips (identical first and last frames), the blended sequence can be looped without introducing artifacts into the looped animation, regardless of the blending weights used to create any of the frames of the looped animation.

Figure 3:
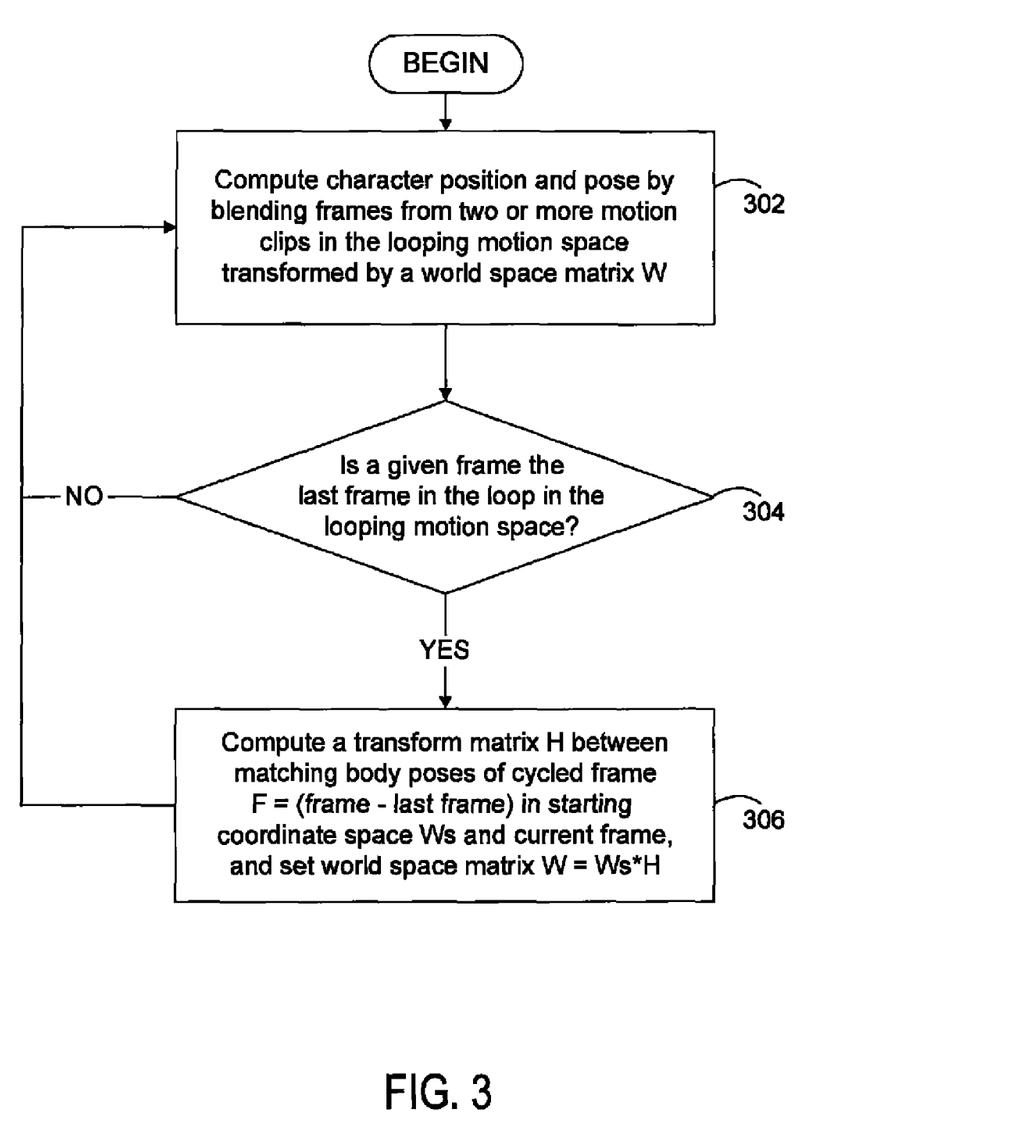
FIG. 3 is a flow chart illustrating a method for a generating a looping motion space for real-time character animation, according to one embodiment of the invention.

As stated, a method of generating a looping motion space for real-time character animation may include a pre-computation phase and a real-time phase. FIG. 3 is a flow chart illustrating a method for a generating a looping motion space for real-time character animation, according to one embodiment of the invention. Persons skilled in the art will understand that even though the method is described in conjunction with the systems of FIGS. 1 and 2, any system configured to perform the steps of the method illustrated in FIG. 3, in any order, is within the scope of the present invention.

At step 302, a rendering application may compute character position and pose by blending frames from two or more motion clips in the looping motion space. As described above, each blended animation clip in the looping motion space may have identical beginning (and ending) frames and a sequence of frames matched to frames of other animation clips in the looping motion space using a registration curve. Each blended frame may depict the pose of a character object at some point in the course of performing a periodic motion. Once the geometry of the character object is computed, based on blending at least two matched frames from motion clips in the looping motion sequence, the position and viewing angle of the character object may be determined. For example, the character may be transformed by a world space matrix (W) that transforms the coordinate space of the character object in the blended animation frame to that of a graphics scene. Step 302 may be repeated to create a sequence of animation frames showing the character depicted in the looping motion space engaging in periodic motion.

At step 304, the rendering application determines whether the last frame of the looping motion space has been reached. If not, then the next frame of the animation clip in the looping motion space is generated (step 302), as described above. As frames from the motion clips in the looping motion space are blended together, the rendering application eventually reaches the last frame. However, because the registration curves and motion clips of the looping motion space were created according to the method of FIG. 2, the last frame of each animation clip matches the first frame of the animation clip.

Once the last frame is reached, at step 306, a new world space matrix (W) may be computed. In one embodiment, the new world space matrix (W) joins the blended frame of the last frame's coordinate position to the original non-transformed coordinate space (WS). This allows animation frames rendered in a subsequent pass through the looping motion space to be inserted into the graphics scene precisely where the prior pass ended. This may include computing the starting body root coordinate space (i.e., WS) using blended motion frame of looped frame F, where F=(current_frame−last_frame_of_clip), computing a transform matrix (H) between matching body poses of cycled frame (WS) and a current pose, and setting W=WS*H so that body orientation matches across the boundary between the prior and subsequent pass through the looping motion space. Because the blended poses match across the loop boundary, the transformed root alignment acts to "snap together" the transformed blended motions.

Figure 4:
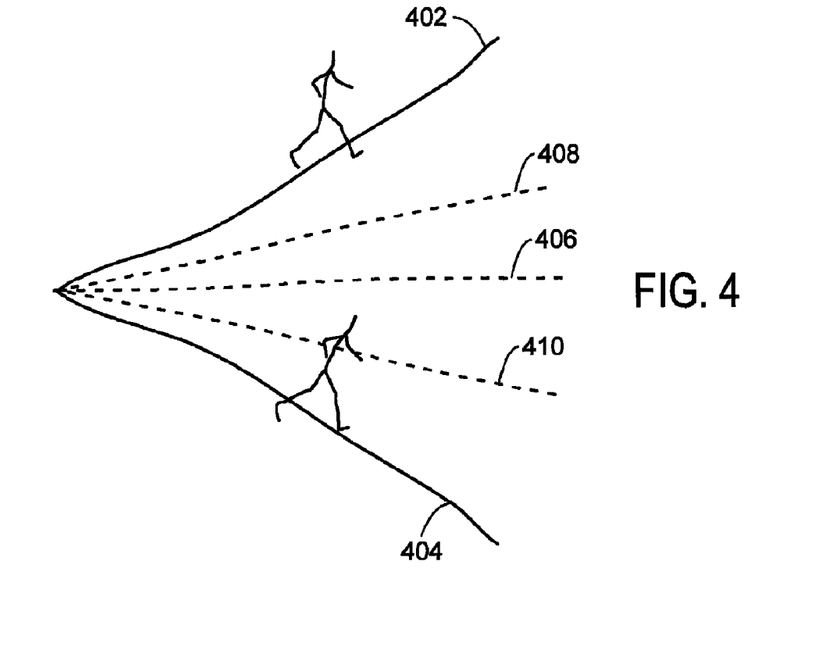
FIG. 4 illustrates two motion clips that may be blended to create a blended path, according to one embodiment of the invention.

FIG. 4 illustrates two motion clips that may be blended to create a blended path, according to one embodiment of the invention. As shown, clip 402 illustrates a figure that is walking at an angle to the left. Clip 404 illustrates a figure that is walking at an angle to the right. Note, however, clips 402, 404 are not meant to represent straight lines, as humans do not typically walk in perfect lines. Accordingly, when blended together the resulting animation clip is not expected to traverse a truly linear path. In one embodiment, the rendering application may use a registration curve to blend clips 402, 404 to create an animation clip that traverses any desired path through the motion space. Path 406 illustrates a blended path where clips 402, 404 are equally weighted in computing the path. Path 406 is not a line, but rather a generally straight path. Path 408 is a blended path of clips 402, 404 where clip 402 is more heavily weighted than clip 404. Because clip 402 is more heavily weighted, the path veers more closely to the path followed by clip 402. Similarly, path 410 is a blended path of clips 402, 404 where clip 404 is more heavily weighted than clip 402. Path 410, therefore, veers closer to the path followed by clip 404.

Figure 5:
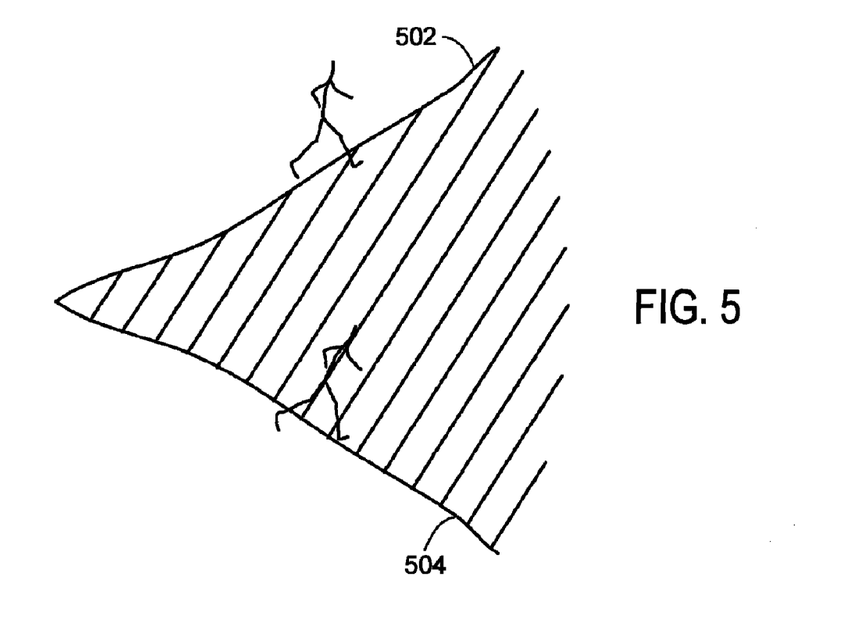
FIG. 5 illustrates a looping motion space generated from two motion clips, according to one embodiment of the invention.

FIG. 5 illustrates a looping motion space that can be created by the blending of two motion clips, according to one embodiment of the invention. As shown, clip 502 illustrates a figure that is walking at an angle to the left. Clip 504 illustrates a figure that is walking at an angle to the right. The shaded area between clips 502, 504 defines the looping motion space. A motion sequence can be defined along any path in the looping motion space by varying the blending weights of clips 502, 504. In this example, two motion clips are included in the looping motion space. Of course, more clips may be used. In one embodiment, when more than two clips are included in the looping motion space, the two clips closest to the desired path are blended together to generate a frame of a blended animation clip.

Figure 6:
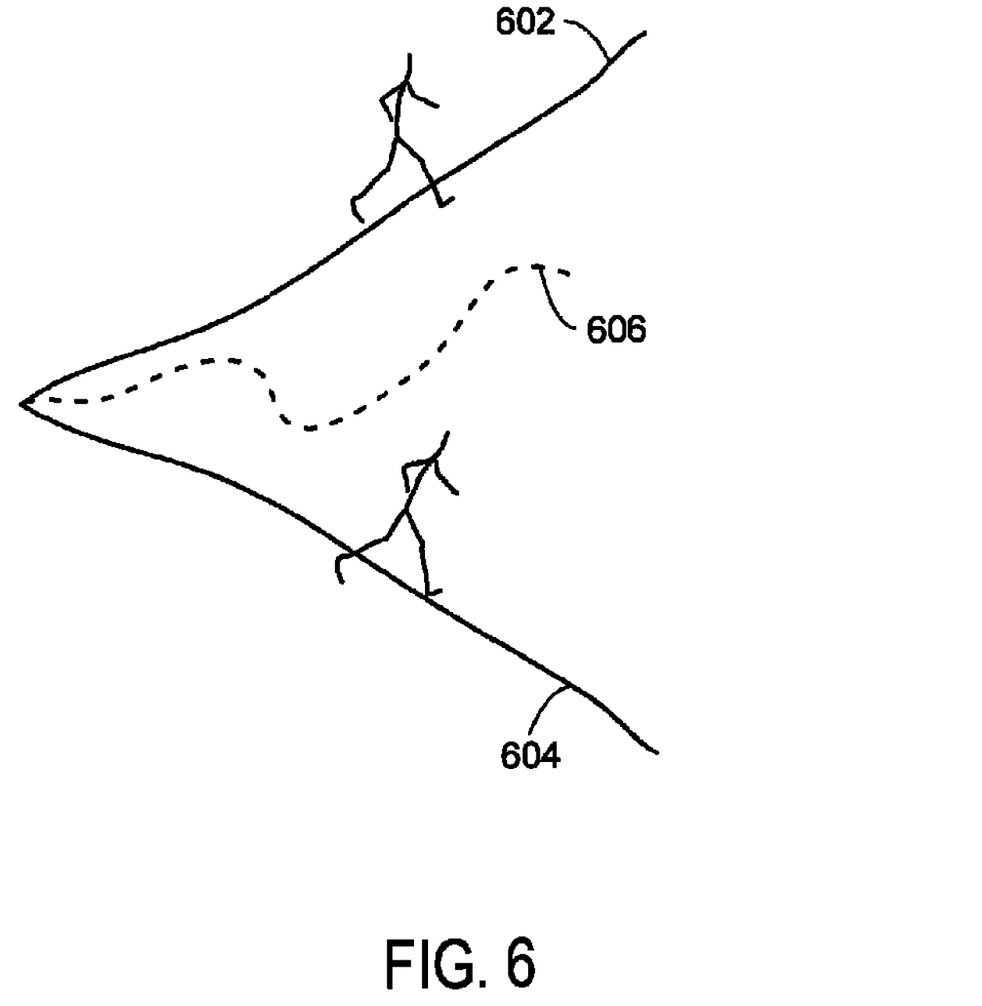
FIG. 6 illustrates a path within the looping motion space created by the blending of two motion clips, according to one embodiment of the invention.

FIG. 6 illustrates a path within the looping motion space created by the blending of two motion clips, according to one embodiment of the invention. As shown, clip 602 illustrates a walking figure that is walking at an angle to the left. Also, clip 604 illustrates a walking figure that is walking at an angle to the right. Path 606 illustrates a path within the looping motion space created by blending paths 602, 604. The winding nature of path 606 can be created by changing the blending weights of the clips 602, 604 in relation to each other, as each frame of the animation sequence is rendered. When clip 602 is more heavily weighted, path 606 veers to the left. When clip 604 is more heavily weighted, path 606 veers to the right. A registration curve may be used to properly blend clips 602, 604 both spatially and temporally so that when a character traverses path 606, the motion looks natural and lacks artifacts. But, importantly, the length of path 606 is finite. Any path through the looping motion space is generated from the sequence of frames in the motion clips associated with that looping motion space. In one embodiment, a longer animation clip may be generated by making multiple rendering passes through the looping motion space.

Figure 7:
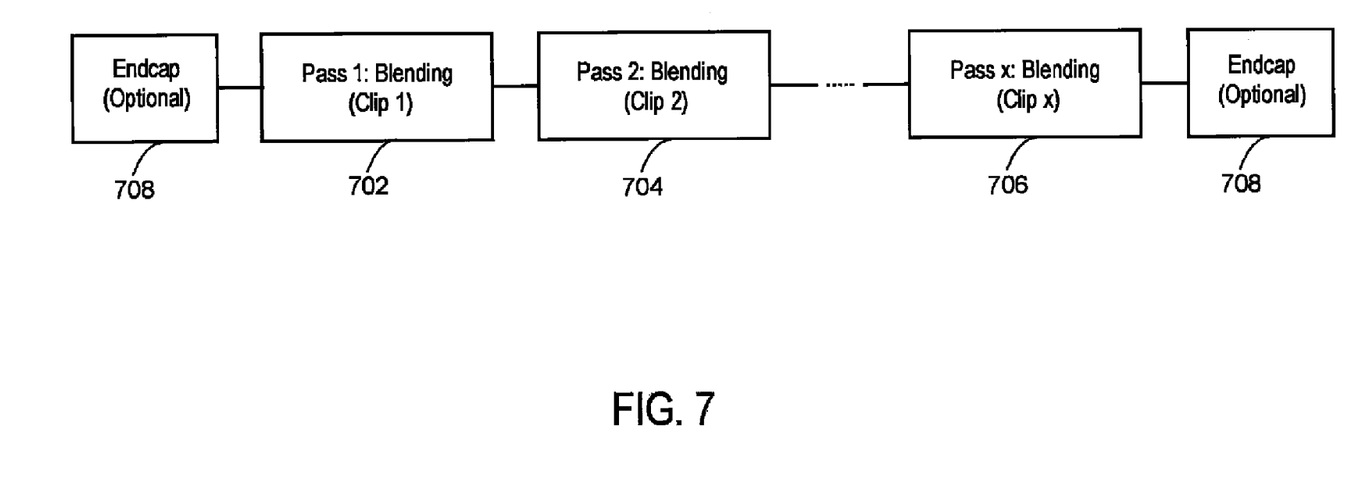
FIG. 7 illustrates a conceptual diagram of an animation sequence generated from a looping motion space, according to one embodiment of the invention.

FIG. 7 illustrates a conceptual diagram of an animation sequence generated from a looping motion space, according to one embodiment of the invention. As shown, a blended animation clip 702 is joined with a blended animation clip 704. As described above, animation clips 702 and 704 may be generated by blending frames from motion clips included in a looping motion space. Further, the rendered sequences may be transformed to a world space of a graphics scene, and the animation clip generated from each pass through the looping motion space may be joined according to method of FIG. 3. Each pass that forms an animation clip is not necessarily identical, as the blending weights may be different for each pass through the looping motion space. Nevertheless, because the animation clips in the looping motion space have are created as described herein, the animation clips may be joined together seamlessly. Therefore, an arbitrarily long animation sequence may be generated by looping thorough the looping motion space as many times as needed, as illustrated by a "clip X" 706.

Furthermore, in one embodiment of the invention, end-cap clips 708 may be added to the beginning or end of a looped sequence. A motion sequence can "bookend" the animated sequence generated from the looping motion space, for example, a clip of a character (a) sitting down and transitioning to a standing position, (b) transitioning from a walking motion to a sitting motion, or (c) any other end-cap motion sequence that would be appropriate given the desired motion.

Figure 8:
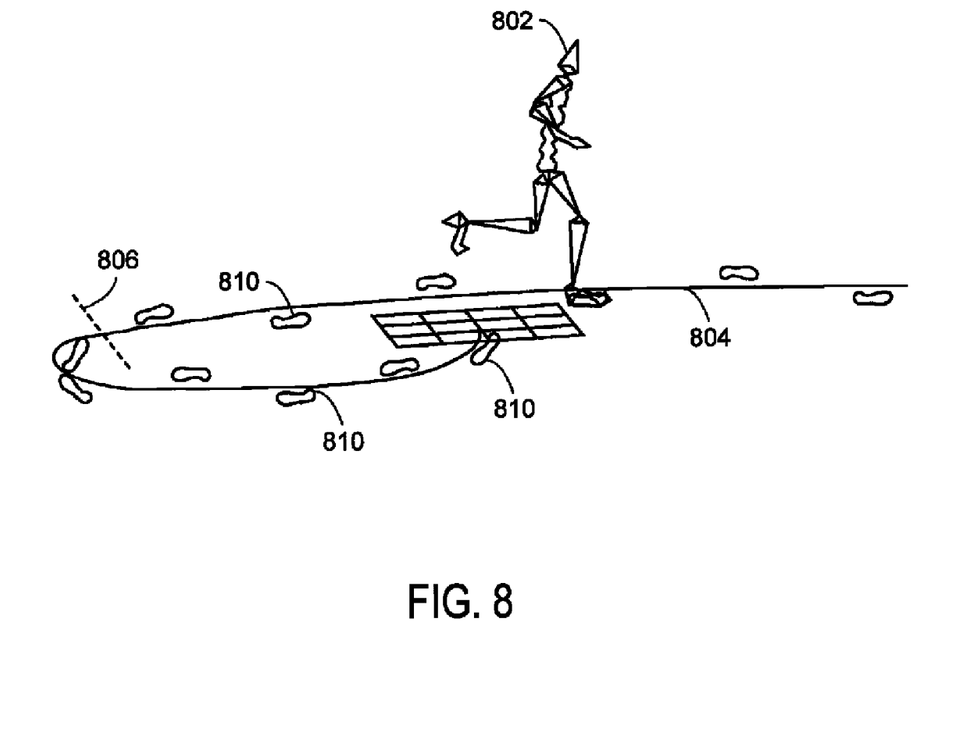
FIG. 8 illustrates a skeletal wire-frame character that follows a path generated from a looping motion space, according to one embodiment of the invention.

FIG. 8 illustrates a skeletal wire-frame character 802 that follows a path generated from a looping motion space, according to one embodiment of the invention. In this example, a rendering application has been used to blend frames from motion clips included in a looping motion space to generate an animation clip with more motion cycles than are present in the looping motion space. As shown, character 802 is illustrated as an athlete running along a path 804. Path 804 was generated using the method of the invention, where several motion clips are blended with different weighting values to follow path 804. In this example, a dashed line 806 represents the boundary between two passes through the looping motion space, and each pass through the looping motion space is six steps in length, depicted by foot prints 810. At the dashed boundary line 806, the figure transitioned from the first pass through the looping motion space to a second pass according to the method of FIG. 3.

Figure 9:
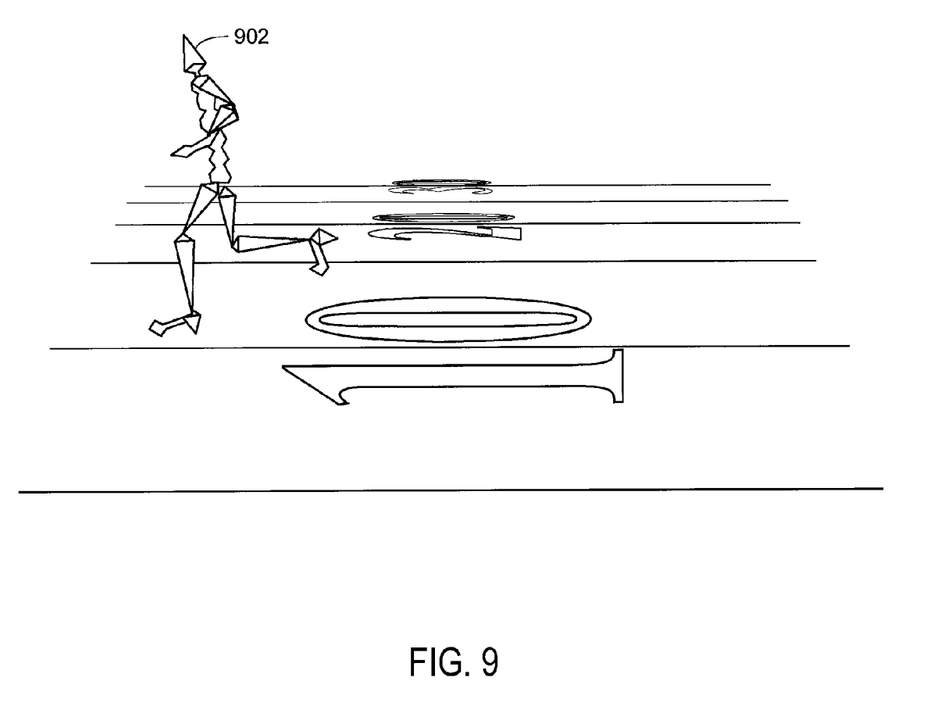
FIG. 9 illustrates a texture-mapped character within a graphics scene, according to one embodiment of the invention.

FIG. 9 illustrates a texture-mapped character 902 within a graphics scene, according to one embodiment of the invention. As shown, character 902 is representative of a football player in a video game running down a football field. Typically, a game player may control the motion of character 902, in real-time. In one embodiment, as character 902 runs down the field, the frames of the video game may be rendered by multiple passes through the looping motion space. Further, the weighted blending may be adjusted in real-time (based on user input) to control the actual path taken by character 902. As frames of character 902 are rendered, the character may be added to the graphics scene using transformation matrices.

As described, embodiments of the invention allow users to generate a looping motion space used for rendering an animation sequence. This is done by synthesizing each motion clip in the looping motion space to have the same number of periodic cycles. The motion clips in the looping motion space are synchronized so that each one begins in phase with one another on a matching registered frame using a registration curve. Further, each such motion clip may be padded so that the pose of the first and last frames are identical. The registration curve spatially and temporally aligns all frames of each motion clip in the looping motion space. Thereafter, an animation clip may be generated by blending the motion clips. Further, a character object depicted in the resulting animation frames may be translated into a world space. Advantageously, because the looping motion space is constructed to begin and end on the same frame, the animation sequence resulting from multiple rendering passes lacks the artifacts of conventional techniques that simply blend together one animation clip with another.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A computer-implemented method of rendering an animation sequence from a plurality of looping motion clips included in a looping motion space, comprising:

determining a number of motion cycles performed by a character object depicted in each of a plurality of motion clips that includes a first motion clip and a second motion clip, wherein a first number of motion cycles performed by the character object in the first motion clip is less than a second number of motion cycles performed by the character object in the second motion clip;

processing each of the first motion clip and the second motion clip to generate a plurality of looping motion clips, wherein each looping motion clip includes the same number of motion cycles bounded by the first number of motion cycles;

identifying a first looping motion clip and a second looping motion clip from the plurality of looping motion clips to blend together, wherein each of the first and second looping motion clips depicts the character object performing an equal number of motion cycles, at least one of the first looping motion clip or the second looping motion clip is padded so that the first frame of the first looping motion clip is identical to the first frame of the second looping motion clip and the last frame of the first looping motion clip is identical to the last frame of the second looping motion clip, and a first frame of the first looping motion clip is synchronized with a first frame of the second looping motion clip so that the motion cycles in each of the first and second looping motion clips are in phase with one another;

rendering, within a computer system, a first frame of the animation sequence by blending the first frame of the first looping motion clip and the first frame of the second looping motion clip;

rendering, within the computer system, subsequent frames of the animation sequence by blending each subsequent frame of the first looping motion clip with a corresponding subsequent frame of the second looping motion clip; and upon determining that a last frame of the first looping motion clip and a last frame of the second looping motion clip have been blended and rendered as a frame of the animation sequence, rendering a next frame of the animation sequence by blending the first frame of the first looping motion clip and the first frame of the second looping motion clip.

2. The method of claim 1, further comprising transforming the character object depicted in the frames of the rendered animation sequence to place the character object within a world space coordinate system of a graphics scene.

3. The method of claim 1, wherein each of the looping motion clips depicts the character object performing a periodic motion.

4. The method of claim 3, wherein the periodic motion depicts a locomotion action of the character object.

5. The method of claim 1, wherein a path of the character object in the rendered animation sequence is controlled by a blending weight specified for each frame rendered from the frames of the first looping motion clip and the frames of the second looping motion clip.

6. The method of claim 1, wherein the frames of the rendered animation sequence are generated in real-time.

7. The method of claim 1, further comprising texture mapping the character object depicted in the frames of the rendered animation sequence.

8. A non-transitory computer-readable storage medium storing instructions that when executed by a processor cause the processor to render an animation sequence from a plurality of looping motion clips included in a looping motion space, by performing the steps of:

determining a number of motion cycles performed by a character object depicted in each of a plurality of motion clips that includes a first motion clip and a second motion clip, wherein a first number of motion cycles performed by the character object in the first motion clip is less than a second number of motion cycles performed by the character object in the second motion clip;

processing each of the first motion clip and the second motion clip to generate a plurality of looping motion clips, wherein each looping motion clip includes the same number of motion cycles bounded by the first number of motion cycles;

identifying a first looping motion clip and a second looping motion clip from the plurality of looping motion clips to blend together, wherein each of the first and second looping motion clips depicts the character object performing an equal number of motion cycles, at least one of the first looping motion clip or the second looping motion clip is padded so that the first frame of the first looping motion clip is identical to the first frame of the second looping motion clip and the last frame of the first looping motion clip is identical to the last frame of the second looping motion clip, and a first frame of the first looping motion clip is synchronized with a first frame of the second looping motion clip so that the motion cycles in each of the first and second looping motion clips are in phase with one another;

rendering a first frame of the animation sequence by blending the first frame of the first looping motion clip and the first frame of the second looping motion clip;

rendering subsequent frames of the animation sequence by blending each subsequent frame of the first looping motion clip with a corresponding subsequent frame of the second looping motion clip; and upon determining that a last frame of the first looping motion clip and a last frame of the second looping motion clip have been blended and rendered as a frame of the animation sequence, rendering a next frame of the animation sequence by blending the first frame of the first looping motion clip and the first frame of the second looping motion clip.

9. The computer-readable storage medium of claim 8, wherein the steps further comprise transforming the character object depicted in the frames of the rendered animation sequence to place the character object within a world space coordinate system of a graphics scene.

10. The computer-readable storage medium of claim 8, wherein each of the looping motion clips depicts the character object performing a periodic motion.

11. The computer-readable storage medium of claim 10, wherein the periodic motion depicts a locomotion action of the character object.

12. The computer-readable storage medium of claim 8, wherein a path of the character object in the rendered animation sequence is controlled by a blending weight specified for each frame rendered from the frames of the first looping motion clip and the frames of the second looping motion clip.

13. The computer-readable storage medium of claim 8, wherein the frames of the rendered animation sequence are generated in real-time.

14. The computer-readable storage medium of claim 8, wherein the steps further comprise texture mapping the character object depicted in the frames of the rendered animation sequence.

15. A method for generating a looping motion space, comprising selecting a plurality of motion clips that includes a first motion clip and a second motion clip to include in the looping motion space; and invoking a looping motion space generation tool provided by a rendering application executing within a computer system, wherein the looping motion space generation tool is configured to:

determine a number of motion cycles performed by a character object depicted in each of a plurality of motion clips that includes a first motion clip and a second motion clip, wherein a first number of motion cycles performed by the character object in the first motion clip is less than a second number of motion cycles performed by the character object in the second motion clip, process each of the first motion clip and the second motion clip to generate a plurality of looping motion clips, wherein each looping motion clip includes the same number of motion cycles bounded by the first number of motion cycles, identify a first looping motion clip and a second looping motion clip from the plurality of looping motion clips to blend together, wherein each of the first and second looping motion clips depicts the character object performing an equal number of motion cycles, at least one of the first looping motion clip or the second looping motion clip is padded so that the first frame of the first looping motion clip is identical to the first frame of the second looping motion clip and the last frame of the first looping motion clip is identical to the last frame of the second looping motion clip, and a first frame of the first looping motion clip is synchronized with a first frame of the second looping motion clip so that the motion cycles in each of the first and second looping motion clips are in phase with one another, render a first frame of the animation sequence by blending the first frame of the first looping motion clip and the first frame of the second looping motion clip, render subsequent frames of the animation sequence by blending each subsequent frame of the first looping motion clip with a corresponding subsequent frame of the second looping motion clip, and upon determining that a last frame of the first looping motion clip and a last frame of the second looping motion clip have been blended and rendered as a frame of the animation sequence, render a next frame of the animation sequence by blending the first frame of the first looping motion clip and the first frame of the second looping motion clip.

16. The method of claim 15, further comprising transforming the character object depicted in the frames of the rendered animation sequence to place the character object within a world space coordinate system of a graphics scene.

17. The method of claim 15, wherein each of the looping motion clips depicts the character object performing a periodic motion.

18. The method of claim 17, wherein the periodic motion depicts a locomotion action of the character object.

19. The method of claim 15, wherein a path of the character object in the rendered animation sequence is controlled by a blending weight specified for each frame rendered from the frames of the first looping motion clip and the frames of the second looping motion clip.

20. The method of claim 15, wherein the frames of the rendered animation sequence are generated in real-time.

21. The method of claim 15, further comprising texture mapping the character object depicted in the frames of the rendered animation sequence.

* * * * *